United States Patent [19]
Yew

[11] Patent Number: 5,494,313
[45] Date of Patent: Feb. 27, 1996

[54] AIR BAG APPARATUS FOR ADAPTABLE FIXATION WITHIN A VEHICLE

[76] Inventor: Soh A. Yew, 576 East Coast Rd., Singapore 1545, Singapore

[21] Appl. No.: 351,939

[22] Filed: Dec. 8, 1994

[51] Int. Cl.$^6$ ................................................. B60R 21/26
[52] U.S. Cl. ........................................... 280/737; 200/741
[58] Field of Search ............................... 280/737, 728.1, 280/736, 741, 742

[56] References Cited

U.S. PATENT DOCUMENTS

| | | | |
|---|---|---|---|
| 3,649,045 | 3/1972 | Smith et al. | 280/737 |
| 3,829,124 | 8/1974 | Charns et al. | 280/737 |
| 5,152,550 | 10/1992 | Hoagland et al. | 280/737 |

*Primary Examiner*—Kenneth R. Rice
*Attorney, Agent, or Firm*—Harrison & Egbert

[57] ABSTRACT

The present invention is an air bag apparatus including a cannister with a compressed gas therein, an air bag affixed to the cannister, a plate member having a piercing member extending therefrom so as to extend into an outlet of the cannister. The outlet of the cannister opens into the interior of the air bag. The piercing member serves to release the compressed gas from the cannister into the air bag when pressure is applied to the plate member above a desired magnitude. The cannister includes a fastener affixed to a surface opposite the outlet. This fastener can be an adhesive strip. The plate member is positioned within the air bag. A resilient member is interposed between the plate member and the cannister so as to be resistive of relative movement therebetween. The piercing member is a needle-like tube which is positioned generally centrally of a plate member. The cannister can be adhesively affixed to a steering wheel, to a door, or within a trunk of a vehicle.

20 Claims, 3 Drawing Sheets

AIR BAG APPARATUS FOR ADAPTABLE FIXATION WITHIN A VEHICLE

TECHNICAL FIELD

The present invention relates to air bag deployment mechanisms. More particularly, the present invention relates to air bag apparatus that is adaptable for positioning within various locations of a vehicle. Additionally, the present invention relates to air bag apparatus that are responsive to impact.

BACKGROUND ART

Heretofore, many automobiles employ air bags. These air bags are responsive to forward impacts on the vehicle. Whenever a forward impact occurs, a compressed gas will quickly fill an air bag, positioned in the forward portion of the vehicle, such that the air bag will reduce the impact of the collision upon the passenger. Typically, such air bags are positioned within the steering wheel of the vehicle.

Unfortunately, impacts occur in automobile accidents from a wide variety of directions. Many times, side impacts will crush the side doors of the vehicles. Other times, rear impacts will cause whiplash injury to the passengers of the vehicle. As such, it would be desirable to be able to integrate an air bag apparatus into the doors, trunk, or in various other locations within the-interior of the vehicle.

It is an object of the present invention to provide an air bag apparatus that can be placed in any desired location within the interior of the vehicle.

It is another object of the present invention to provide an air bag apparatus that is responsive to impact above a desired magnitude.

It is a further object of the present invention to provide an air bag apparatus that is easy to install, relatively inexpensive, and easy to produce.

These and other objects and advantages of the present invention will become apparent from a reading of the attached specification and appended claims.

SUMMARY OF THE INVENTION

The present invention is an air bag apparatus that comprises a cannister having a compressed gas therein, an air bag affixed to the cannister, and a plate member having a piercing means extending therefrom. The cannister has an outlet that opens into the interior of the air bag. The piercing means extends into this outlet of the cannister so as to release the compressed gas from the cannister into the air bag when pressure is applied to the plate member above a desired magnitude. The cannister has a fastener affixed to a surface opposite the outlet. Specifically, this fastener is an adhesive strip. The cannister can be adhesively affixed to a steering wheel of a vehicle, to a door of a vehicle such that the air bag faces the interior of the vehicle, or to the back of a trunk of a vehicle such that the air bag faces the passenger compartment of the vehicle.

The air bag is folded and sealed around an edge of the cannister. The plate member has a flat surface in generally parallel relationship to a surface of the cannister. The plate member has a length that is greater than the diameter of the cannister. The plate member is positioned within the air bag.

The outlet of the cannister is a nozzle that extends outwardly into the air bag. The piercing means is positioned centrally within this nozzle. The plate member is supported in generally parallel relationship with a surface of the cannister. A resilient member is interposed between the plate member and the cannister so as to be resistive of relative movement therebetween. The resilient member is a spring extending around the nozzle. The spring has one end abutting the plate member and an opposite end abutting the cannister. The piercing means is a needle that is positioned generally centrally of the plate member.

DETAILED DESCRIPTION OF THE INVENTION

Figure 1:
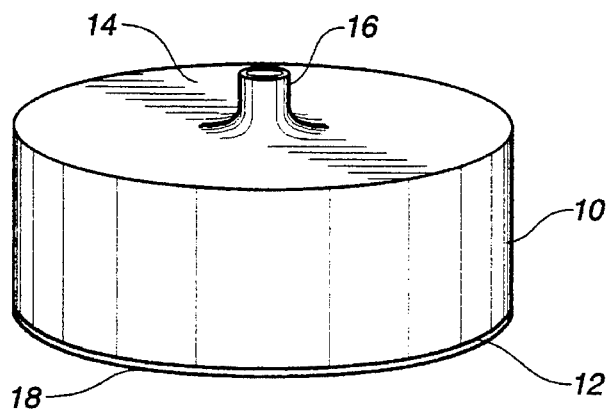
FIG. 1 is a perspective view showing the cannister as used with the present invention.

FIG. 1 is an illustration of the cannister 10 of the present invention as employed with the air bag for the protection of a passenger of a vehicle. The cannister 10 has a bottom surface 12, a top surface 14 and an outlet 16. The bottom surface 12 can include a fastener 18 that allows the cannister 10 to be affixed to a surface within the interior of a vehicle. The outlet 16 is positioned on the surface 14 opposite the fastener 18. The outlet 16 is a nozzle that allows compressed gas from the interior of cannister 10 to enter the air bag.

The outlet 16 of the cannister 10 is sealed so as to contain any approved compressed gas within the interior of the cannister 10. This compressed gas can be carbon dioxide (or similar chemicals) in which a large volume of gas is released as a result of chemical explosion.

Figure 2:
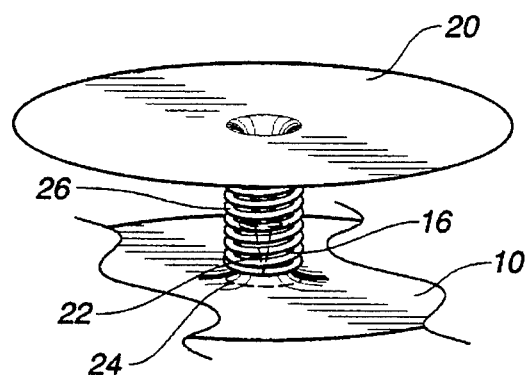
FIG. 2 is an isolated view of the piercing means between the plate member and the cannister.

FIG. 2 is a detailed view showing how the gas can be released from the interior of the cannister 14. It can be seen that a plate member member 20 has a piercing member 22 extending downwardly therefrom. The piercing member 22 has a needle-like appearance which is positioned generally centrally of the outlet 16. It can be seen that a seal 24 is used to close the outlet 16 and to prevent the gas from leaving the cannister 10.

The plate 20 is a flat plate that is positioned in generally parallel relationship to the surface 14 of the cannister 10. When forces are imparted to the plate member 20, the piercing member 22 will move downwardly within the outlet 16 so as to pierce the seal 24 of the cannister 10. The piercing of this seal 24 will cause the gas on the interior of the cannister 10 to be rapidly expelled outwardly through the outlet 16.

In FIG. 2, it can be seen that a resilient member 26 extends around the exterior of the outlet 16. The resilient member 26 is a spring that has one end abutting the plate member 20 and the other end abutting the top surface 14 of the cannister 10. The resilient member 26 serves to resist relative movement of the plate member 20 with respect to the cannister 10. The resilient member 26 can also serve to maintain the plate member 20 in parallel relationship to the cannister 10.

The piercing member 22 is a needle-like tube that allows the compressed gas from the interior of cannister 10 to pass therethrough and into the air bag. The resilient member 26 serves to regulate and to limit the deploying of the air bag. As such, only forces above a predetermined magnitude will cause the air bag apparatus to actuate.

Figure 3:
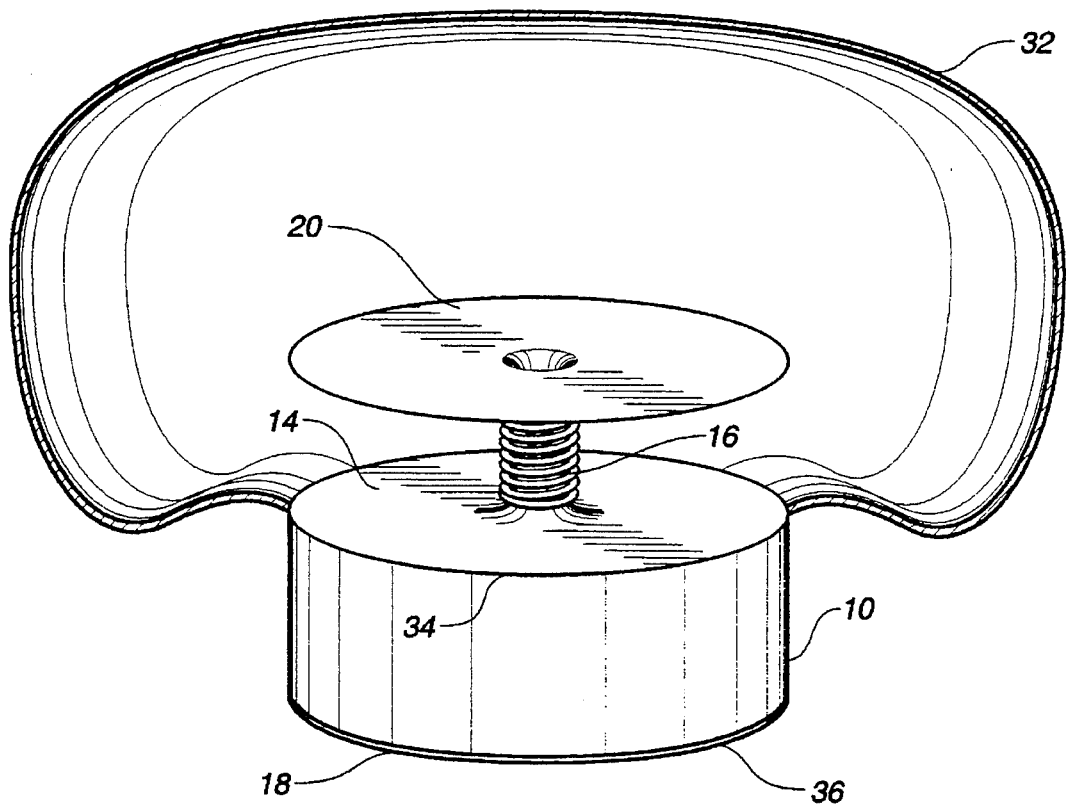
FIG. 3 is an illustration of the air bag apparatus in accordance with the preferred embodiment of the present invention.

FIG. 3 shows the air bag apparatus 30 of the present invention. In particular, it can be seen that the cannister 10 has an air bag 32 affixed to the surface 14 of the cannister 10. Specifically, the air bag is folded and sealed around the edge 34 of cannister 10. The outlet 16 extends into the interior of the air bag 32. Similarly, the plate member 20 is positioned on the interior of the air bag 32. It can be seen that the plate member 20 has a flat surface which is in generally parallel relationship to the surface 14 of the cannister 10. An adhesive strip 36 is affixed to the surface 18 of the cannister 10. The adhesive strip 36 allows the cannister 10 to be properly positioned on any available surface. As such, the air bag apparatus of the present invention is adaptable for positioning within various locations on the interior of the vehicle.

Figure 4:
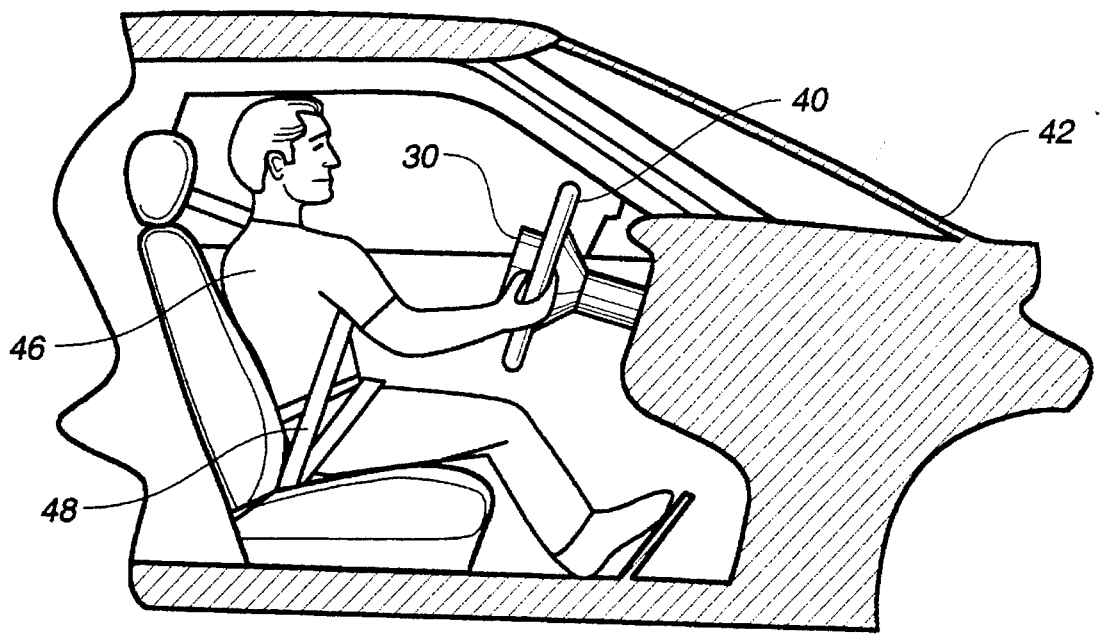
FIG. 4 shows the air bag apparatus of the present invention as deployed on the steering wheel of a vehicle.
Figure 5:
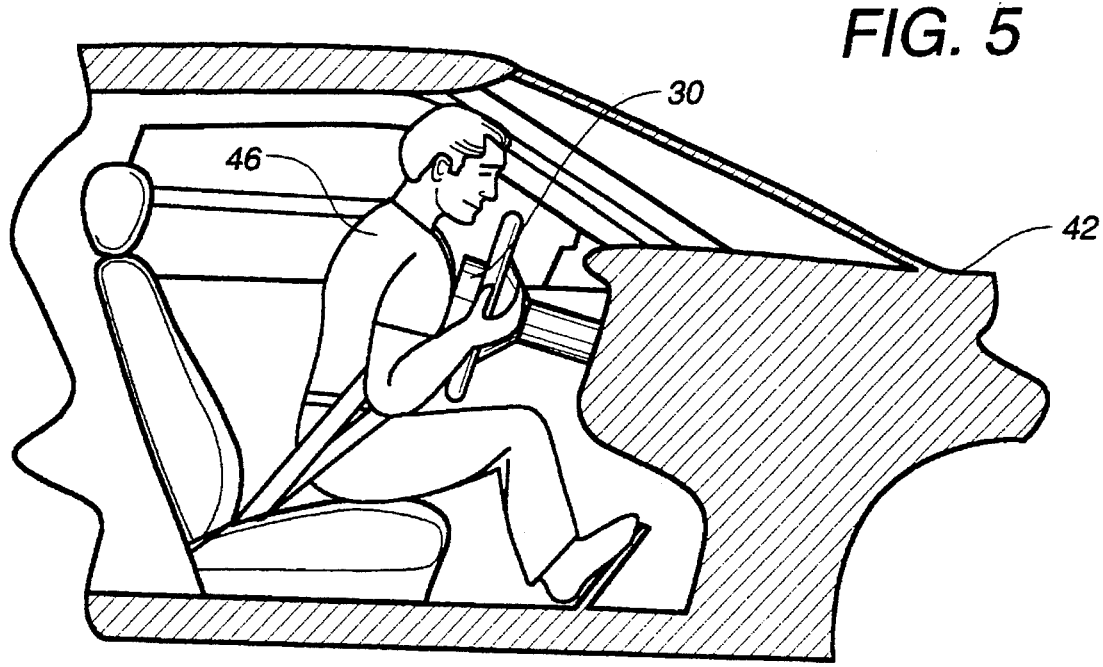
FIG. 5 shows an initial impact affecting the air bag apparatus of the present invention.
Figure 6:
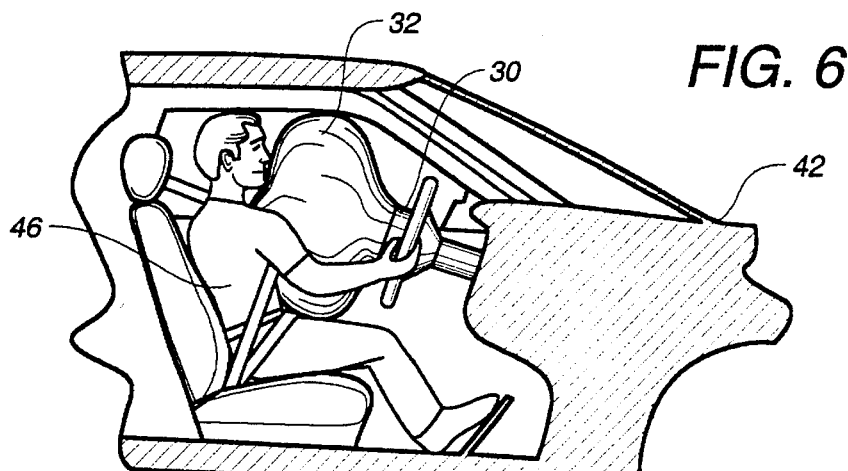
FIG. 6 shows the air bag apparatus of FIGS. 4 and 5 as deployed.

FIGS. 4–6 show the operation of the present invention. It can be seen in FIG. 4 that the air bag apparatus 30 is affixed to the steering wheel 40 of a vehicle 42. In FIG. 4, the passenger 46 is in a normal position and is initially restrained by a shoulder harness 48. FIG. 5 illustrates the forward impact of the vehicle 42. The passenger 46 is thrown forward so that the chest of the passenger 46 abuts the air bag apparatus 30 on the steering wheel 40. It is assumed that the impact between the passenger 46 and the air bag apparatus 30 is sufficient so as to overcome the resistive pressures of the resilient member 26 and is sufficient to cause the piercing of the seal 24 of the cannister 10.

FIG. 6 shows that the air bag 32 is deployed from the air bag apparatus 30 so as to cushion the impact of the passenger 46. Because of the arrangement of the present invention, the air bag 32 is immediately deployed. As such, injury to the passenger 46 is effectively avoided.

Figure 7:
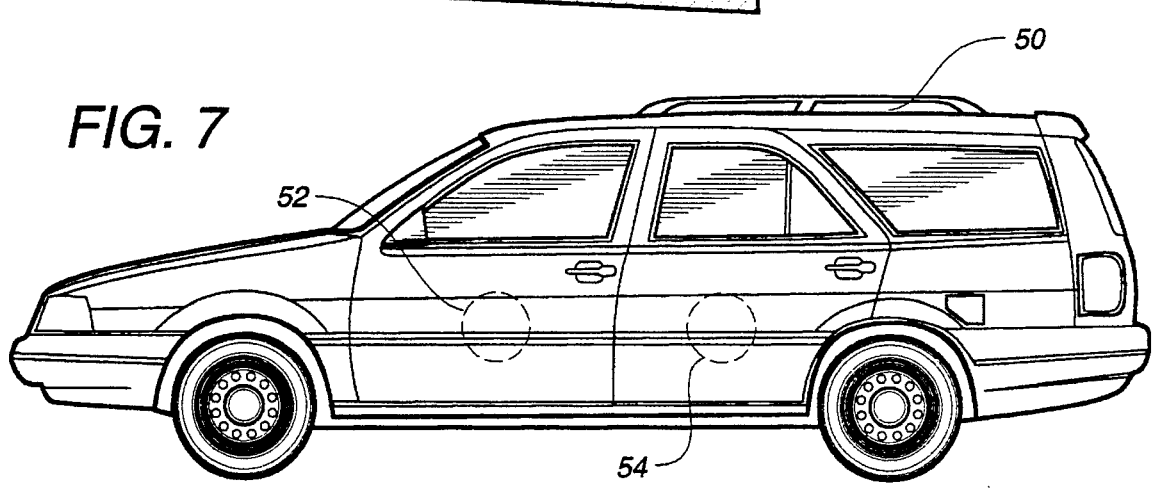
FIG. 7 shows the positioning of the air bag apparatus within the doors of a vehicle.

FIG. 7 shows that the air bag apparatus can be deployed in other locations within a vehicle 50. In FIG. 7, a first air bag apparatus 52 is employed on the driver-side door of the vehicle. Similarly, another air bag apparatus 54 is employed on the rear passenger driver side door of the vehicle. The air bag apparatus 52 and 54 can be attached to their respective doors by simply affixing the adhesive strip 26 to the interior surface of the door. The air bag 32 should face the interior of the vehicle. The arrangement shown in FIG. 7 is particularly desirable when side impacts occur. The arrangement of the plate member 20, in conjunction with the compressed air cannister 10, will allow the air bag to be deployed so that injuries to the passenger, from side impact, are effectively avoided.

Figure 8:
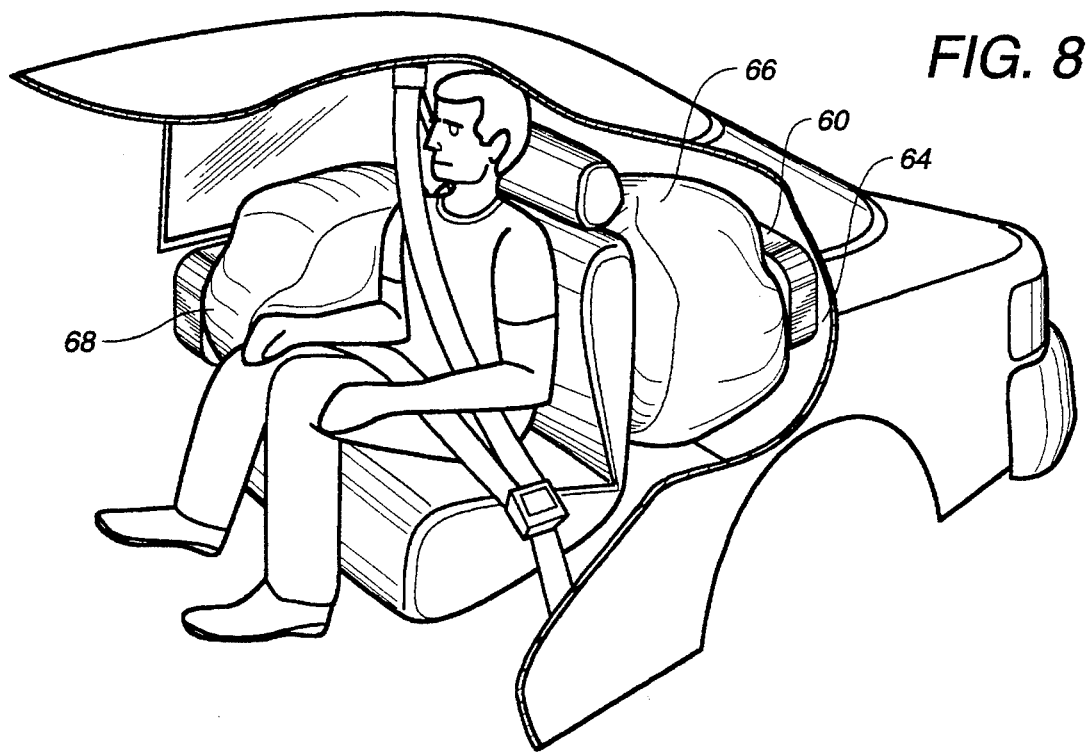
FIG. 8 shows the air bag apparatus of the present invention as deployed in the rear of the vehicle.

FIG. 8 shows that the air bag apparatus 60 can be positioned in the back of the trunk 62 of the vehicle 64. When the air bag apparatus 60 is deployed in this manner, collisions affecting the rear of the vehicle will cause the air bag 66 to be deployed. The deploying of the air bag 66 can be prevent injuries that occur from such rear end collisions. FIG. 8 also shows the air bag apparatus 52 as deploying air bag 68 in a side collision.

In the event of an accident, the passengers may be thrown forward before the seat belt can properly restrain the passenger. In such event, the air bag is triggered so as to cushion the second, bounce back, collision between the passenger and the steering wheel. On such "bounce back" impacts, the seat belt is usually unable to restrain the passengers. As such, the present invention avoids such "bounce back" injuries.

The application of the present invention is virtually limitless. It can be installed at the back of the trunk of a car or in the side doors of the car. Any impact from any direction, so long as the pressure is great enough to puncture the cannister, will cause the air bag to immediately cushion the impact and to minimize injuries. The present invention can be used with any type of vehicle, such as cars, trucks, airplanes, and boats.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. An air bag apparatus comprising:

a cannister having a compressed gas therein;

an air bag affixed to said cannister, said cannister having an outlet opening into said air bag; and a plate member having a piercing means extending therefrom, said piercing means extending into said outlet of said cannister, said piercing means for releasing said compressed gas from said cannister into said air bag when pressure is applied to said plate member above a desired magnitude said piercing means being a needle-like tube.

2. The apparatus of claim 1, said cannister having a fastener affixed to a surface opposite said outlet.

3. The apparatus of claim 2, said fastener being an adhesive strip.

4. The apparatus of claim 1, said air bag being folded and sealed around an edge of said cannister.

5. The apparatus of claim 1, said plate member having a flat surface in generally parallel relationship to a top surface of said cannister.

6. The apparatus of claim 5, said plate member having a length greater than a diameter of said cannister.

7. The apparatus of claim 5, said plate member positioned within said air bag.

8. The apparatus of claim 1, said outlet of said cannister being a nozzle extending outwardly into said air bag, said piercing means positioned centrally within said nozzle, said plate member supported in generally parallel relationship with a surface of said cannister.

9. The apparatus of claim 8, further comprising:

a resilient member interposed between said plate member and said cannister so as to be resistive of relative movement therebetween.

10. The apparatus of claim 9, said resilient member being a spring extending around said nozzle, said spring having one end abutting said plate member, said spring having an opposite end abutting said cannister.

11. The apparatus of claim 1, said piercing means being a needle-like tube positioned generally centrally of said plate member.

12. The apparatus of claim 1, said cannister being adhesively affixed to a steering wheel of a vehicle.

13. The apparatus of claim 1, said cannister being adhesively affixed to a door of a vehicle such that said air bag faces an interior of said vehicle.

14. The apparatus of claim 1, said cannister being adhesively affixed to a back of a trunk of a vehicle such that said air bag faces a passenger compartment of the vehicle.

15. The apparatus of claim 1, said outlet opening having a seal formed therein, said piercing means for opening said seal.

16. An air bag apparatus comprising:

a cannister having a compressed gas therein;

an air bag affixed a surface of said cannister so as to extend over an outlet opening of said cannister;

a plate member having a piercing means extending therefrom, said piercing means extending into said outlet of said cannister, said piercing means for releasing said compressed gas from said cannister into said air bag when pressure is applied to said plate member above a desired magnitude; and a fastener affixed to a surface of said cannister opposite said air bag.

17. The apparatus of claim 16, further comprising:

a resilient member interposed between said plate member and said cannister so as to be resistive of relative movement therebetween.

18. The apparatus of claim 17, said resilient member being a spring extending around said nozzle, said spring having one end abutting said plate member, said spring having an opposite end abutting said cannister.

19. The apparatus of claim 16, said outlet of said cannister being a nozzle extending outwardly into said air bag, said piercing means positioned centrally within said nozzle, said plate member supported in generally parallel relationship with said surface of said cannister, said plate member positioned within said air bag.

20. The apparatus of claim 16, said plate member having a flat surface in generally parallel relationship to a surface of said cannister, said plate member having a length greater than a diameter of said cannister.

* * * * *